(12) United States Patent
Kamimura

(10) Patent No.: US 10,774,671 B2
(45) Date of Patent: Sep. 15, 2020

(54) VALVE DEVICE AND STEAM TURBINE

(71) Applicant: MITSUBISHI HEAVY INDUSTRIES COMPRESSOR CORPORATION, Tokyo (JP)

(72) Inventor: Tomoya Kamimura, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 161 days.

(21) Appl. No.: 16/171,507

(22) Filed: Oct. 26, 2018

(65) Prior Publication Data
US 2019/0153888 A1    May 23, 2019

(30) Foreign Application Priority Data
Nov. 17, 2017  (JP) .................................. 2017-222121

(51) Int. Cl.
| | |
|---|---|
| *F01D 17/14* | (2006.01) |
| *F16K 11/20* | (2006.01) |
| *F16K 31/163* | (2006.01) |
| *F16K 31/52* | (2006.01) |
| *F16K 1/44* | (2006.01) |
| *F16K 27/02* | (2006.01) |
| *F16K 31/44* | (2006.01) |

(52) U.S. Cl.
CPC ............ *F01D 17/145* (2013.01); *F16K 1/443* (2013.01); *F16K 11/205* (2013.01); *F16K 27/02* (2013.01); *F16K 31/163* (2013.01); *F16K 31/44* (2013.01); *F16K 31/52* (2013.01); *F05D 2220/31* (2013.01); *F05D 2260/52* (2013.01); *F05D 2260/57* (2013.01)

(58) Field of Classification Search
CPC ...... F01D 17/145; F16K 1/443; F16K 11/205; F16K 27/02; F16K 31/163; F16K 31/44; F16K 31/52; F05D 2220/31; F05D 2260/52; F05D 2260/57
See application file for complete search history.

(56) References Cited

U.S. PATENT DOCUMENTS

| | | | | |
|---|---|---|---|---|
| 2,385,537 A | * | 9/1945 | Pentheny ................ | F01D 17/18 137/630.19 |
| 3,322,153 A | * | 5/1967 | Rankin .................... | F01D 1/023 137/630.19 |
| 3,763,894 A | * | 10/1973 | Meyer ................... | F01D 17/145 137/630.19 |

FOREIGN PATENT DOCUMENTS

JP     2010-048216 A     3/2010

\* cited by examiner

*Primary Examiner* — J. Todd Newton
*Assistant Examiner* — Sabbir Hasan
(74) *Attorney, Agent, or Firm* — Osha Liang LLP

(57) ABSTRACT

The present disclosure provides a valve device, which includes: a valve casing in which an inlet flow passage, an intermediate flow passage, and an outlet flow passage are formed; an outlet rod part coupled to the outlet valve body; an interlocking shaft part that linearly moves the outlet rod part in a direction of a first central axis; an intermediate rod part coupled to an intermediate valve body; and an intermediate actuator part that linearly moves the intermediate rod part in the direction of the second central axis. The intermediate actuator part has a link part that converts displacement of the linear motion member, which is advanced and retreated in the direction perpendicular to the direction of the second central axis, into displacement of the linear motion member in the direction of the second central axis and transmit the converted displacement to the intermediate rod part.

8 Claims, 3 Drawing Sheets

VALVE DEVICE AND STEAM TURBINE

BACKGROUND

Field

The present disclosure relates to a steam turbine.

Priority is claimed on Japanese Patent Application No. 2017-222121, filed Nov. 17, 2017, the content of which is incorporated herein by reference.

Description of Related Art

Steam turbines drive and rotate a rotor using steam supplied from a boiler. Steam turbines transmit the rotation of the rotor, and thereby operate a compressor or an electric generator.

In steam turbines, to supply steam from the boiler to a turbine body, a governing valve and a stop valve are provided. When an opening degree of the governing valve is adjusted, a flow rate of the steam supplied to the turbine body can be adjusted. The stop valve is in an open state during normal operation of the steam turbine. Thereby, steam is supplied from the boiler to the turbine body through a steam supply pipe. When a certain abnormality occurs in a steam turbine, the stop valve enters a closed state, and the supply of steam from the boiler to the turbine body is interrupted.

A valve device in which the governing valve and the stop valve are integrated is disclosed in Patent Document 1. In the valve device, a main steam stop valve that is a stop valve and a steam regulating valve that is a governing valve are coupled perpendicularly to each other. To be specific, a valve rod of the main steam stop valve is made movable in a horizontal direction, and a valve rod of the steam regulating valve is made movable in a vertical direction.

[Patent Document 1] Japanese Unexamined Patent Application, First Publication No. 2010-48216

SUMMARY

However, in this valve device, an actuator such as a hydraulic cylinder for moving the valve rod of the main steam stop valve in the horizontal direction is provided to protrude outside the valve rod in the horizontal direction. As a result, the valve device is enlarged in the horizontal direction. In contrast, for example, in the case of a structure in which the valve rod of the main steam stop valve is movable in the vertical direction and is parallel to the valve rod of the steam regulating valve, the structure has a complicated shape in which flow passages of the main steam stop valve and the steam regulating valve which are formed in valve casings are bent several times. As a result, the assemblability deteriorates when a valve seat, a valve body, etc. disposed in the valve casing are incorporated. For this reason, as in the case of a structure in which the valve casing of the steam regulating valve and the valve casing of the main steam stop valve are made separately, and then are integrally fixed by welding, there is a need to secure assemblability. However, when separate valve casings are fixed by welding or the like, there is a need to secure a region for fixing, and the valve casings become enlarged as a whole. For this reason, it is desired to achieve miniaturization while securing assemblability.

The present disclosure provides a valve device and a steam turbine capable of achieving miniaturization while ensuring assemblability thereof.

A valve device according to a first aspect of the present disclosure includes: a valve casing in which an inlet flow passage into which a fluid flows, an intermediate flow passage that is configured to communicate with the inlet flow passage and cause the fluid to circulate in a direction that intersects the inlet flow passage, and an outlet flow passage that is configured to communicate with the intermediate flow passage and cause the fluid to circulate in a direction that intersects the intermediate flow passage are formed; an outlet valve seat part provided on the outlet flow passage; an outlet valve body configured to come into contact with the outlet valve seat part and to close the outlet flow passage; an outlet rod part configured to extend along a first central axis and to have an end of a first side in a direction of the first central axis coupled to the outlet valve body; an interlocking shaft part configured to linearly move the outlet rod part in the direction of the first central axis; an intermediate valve seat part provided on the intermediate flow passage; an intermediate valve body configured to come into contact with the intermediate valve seat part and to close the intermediate flow passage; an intermediate rod part configured to extend along a second central axis that intersects the first central axis and to have an end of a first side in a direction of the second central axis coupled to the intermediate valve body; and an intermediate actuator part configured to linearly move the intermediate rod part in the direction of the second central axis. The intermediate actuator part has: a driving part that is configured to advance and retract a linear motion member in a direction perpendicular to the direction of the second central axis; and a link part that is configured to connect the intermediate rod part to the linear motion member, convert displacement of the linear motion member from the direction perpendicular to the direction of the second central axis to the direction of the second central axis, transmit the converted displacement to the intermediate rod part, and move the intermediate rod part in the direction of the second central axis.

According to this constitution, in comparison with a case in which the piston rod part moving in the direction of the second central axis is connected to an outer end of the intermediate rod part in the direction of the second central axis, the size of the valve device in the direction of the second central axis can be reduced. The intermediate flow passage is formed at a position that intersects the outlet flow passage, and thereby a shape of the internal space of the valve casing can be simplified compared to a case in which the intermediate flow passage and the outlet flow passage are provided parallel to each other. For this reason, assemblability when the outlet valve seat part or the outlet valve body is incorporated into the valve casing can be improved.

In the valve device according to a second aspect of the present disclosure, in the first aspect, the valve casing may have: a valve casing body in which the inlet flow passage, the intermediate flow passage, and the outlet flow passage are formed, and which has an external opening that opens to communicate with an outside at a position that faces the intermediate valve seat part in a size in which the intermediate valve body is insertable; and a lid part that blocks the external opening and slidably supports the intermediate rod part.

According to this constitution, the external opening faces the intermediate flow passage. Thereby, when the inside of the valve casing body is viewed from outside in the direction of the second central axis, a region in which the outlet flow passages are formed is visible. That is, a component can be easily inserted from outside into the region in which the outlet flow passages are formed via the external opening. As a result, the assemblability around the outlet flow passages can be improved.

In the valve device according to a third aspect of the present disclosure, in the second aspect, the valve device may further include an inner bar that is connected to the outlet rod part and moves a plurality of outlet valve bodies provided to correspond to a plurality of outlet flow passages formed apart from each other in the direction of the second central axis all at once. The inner bar may be formed in a size in which the inner bar is insertable through the external opening and the intermediate flow passage.

According to this constitution, the inner bar can be inserted from the external opening. Therefore, workability can be improved when a valve device having a complicated constitution in which the plurality of outlet flow passages are formed is assembled.

In the valve device according to a fourth aspect of the present disclosure, in any one of the first to third aspects, the direction of the first central axis may be a vertical direction, and the direction of the second central axis may be a horizontal direction.

In the valve device according to a fifth aspect of the present disclosure, in any one of the first to fourth aspects, the driving part may be a hydraulic cylinder, and a piston rod part that is the linear motion member may extend upward in the vertical direction relative to a cylinder part in which oil is stored.

According to this constitution, an opening portion of the cylinder part is directed upward in the vertical direction, and the oil in the cylinder can be prevented from leaking out. Therefore, maintenance work such as cleaning around the driving source can be reduced.

A steam turbine according to a sixth aspect of the present disclosure includes: the valve device according to any one of the first to fifth aspects; and a turbine body driven by steam supplied from the valve device.

With this constitution, miniaturization of the valve device can be achieved, and miniaturization of the steam turbine can also be achieved.

According to the present disclosure, miniaturization can be achieved while securing assemblability.

DETAILED DESCRIPTION

Hereinafter, an embodiment of the present disclosure will be described with reference to FIGS. 1 to 3.

Figure 1:
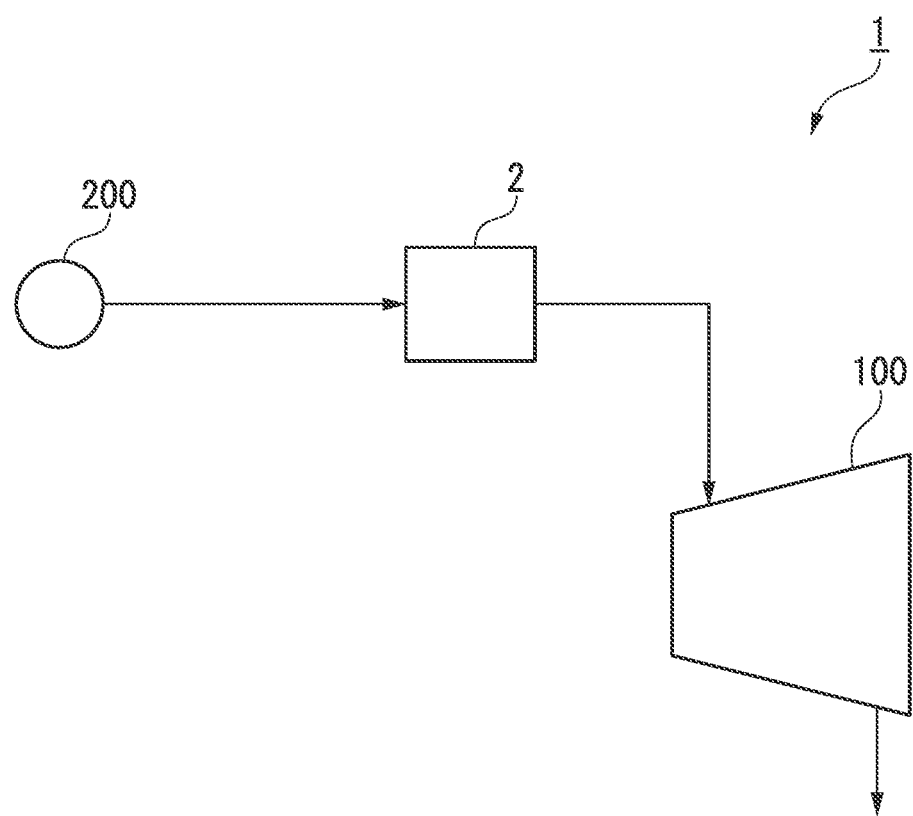
FIG. 1 is a schematic view showing a whole constitution of a steam turbine using a stop valve according to an embodiment of the present disclosure.

As shown in FIG. 1, a steam turbine 1 of the present embodiment includes a turbine body 100 and a valve device 2.

The turbine body 100 is supplied with steam (a fluid) from a steam supply source 200 such as a boiler. In the turbine body 100, a rotor (not shown) that is rotatably provided in a casing (not shown) is driven and rotated by the supplied steam. The rotation of the rotor (not shown) is transmitted to, for instance, an electrical generator via an output shaft so that electrical power is produced.

The valve device 2 is a composite valve into which a governing valve (GV), a stop valve (TTV), and an overload valve are integrated. The valve device 2 is provided close to an inlet of the turbine body 100, and adjusts a steam amount of the steam supplied to the turbine body 100. As shown in FIG. 2, the valve device 2 includes a valve casing 21, an outlet valve seat part 22, an outlet valve body 23, an inner bar 24, an outlet rod part 25, an interlocking shaft part 26, an intermediate valve seat part 27, an intermediate valve body 28, an intermediate rod part 29, and an intermediate actuator part 30.

The valve casing 21 forms a space acting as a flow passage in which the steam circulates. The valve casing 21 of the present embodiment includes a valve casing body 211 and a lid part 212.

An inlet flow passage 51, an intermediate flow passage 52, an outlet flow passage 53, and an external opening 54 are formed in the valve casing body 211. A space in which the steam circulates between the inlet flow passage 51 and the outlet flow passage 53 via the intermediate flow passage 52 is formed in the valve casing body 211.

The inlet flow passage 51 is an opening into which the steam flowing from an upstream side flows. The inlet flow passage 51 is connected to a line such as a pipe connected to the steam supply source 200. In the present embodiment, the inlet flow passage 51 includes a first inlet flow passage 51a and a second inlet flow passage 51b. The first inlet flow passage 51a and the second inlet flow passage 51b are formed apart from each other in a width direction (a horizontal direction) Dw of the valve device 2. That is, the steam is supplied to the valve device 2 of the present embodiment from the two inlet flow passages 51.

The intermediate flow passage 52 communicates with the inlet flow passage 51, and causes the steam to circulate in a direction that intersects the inlet flow passage 51. The intermediate flow passage 52 of the present embodiment is formed at a position perpendicular to the inlet flow passage 51. The intermediate flow passage 52 is formed inwards from the inlet flow passage 51 in the width direction Dw. The intermediate flow passage 52 causes the steam flowing in from the inlet flow passage 51 to circulate inward in the width direction Dw. In the present embodiment, the intermediate flow passage 52 is provided with a first intermediate flow passage 52a formed at a position adjacent to the first inlet flow passage 51a, and a second intermediate flow passage 52b formed at a position adjacent to the second inlet flow passage 51b.

The outlet flow passage 53 communicates with the intermediate flow passage 52, and causes the steam to circulate in a direction that intersects the intermediate flow passage 52. The outlet flow passage 53 is connected to a line such as a pipe connected to the turbine body 100. The outlet flow passage 53 of the present embodiment is formed at a position perpendicular to the inlet flow passage 51 and the intermediate flow passage 52. The outlet flow passage 53 is formed inwards from the intermediate flow passage 52 in the width direction Dw. The outlet flow passage 53 causes the steam flowing in from the intermediate flow passage 52 to circulate downward in a vertical direction Dv. A plurality of outlet flow passages 53 are provided apart from each other in the width direction Dw. In the present embodiment, the outlet flow passage 53 is provided with a plurality of first outlet flow passages 53a (four first outlet flow passages in the present embodiment) and one second outlet flow passage 53b.

The plurality of first outlet flow passages 53a are formed to be lined up away from each other in the width direction Dw. The second outlet flow passage 53b is formed to be interposed midway between the first outlet flow passages 53a in the width direction Dw.

The external opening 54 is formed in such a size that the intermediate valve body 28 (to be described below) can be inserted thereinto. The external opening 54 opens to communicate with the outside at a position that faces the intermediate flow passage 52. The external opening 54 of the present embodiment is formed at a position perpendicular to the inlet flow passage 51 and the outlet flow passage 53. The external opening 54 is formed outwards from the inlet flow passage 51 in the width direction Dw. That is, the external opening 54 is formed across the inlet flow passage 51 on a side opposite to the intermediate flow passage 52 in the width direction Dw. The external opening 54 is formed such that a position thereof in the vertical direction Dv overlaps the intermediate flow passage 52 and the inlet flow passage 51. In the present embodiment, the external opening 54 is provided with a first external opening 54a formed at a position adjacent to the first inlet flow passage 51a, and a second external opening 54b formed at a position adjacent to the second inlet flow passage 51b. The first external opening 54a, the second external opening 54b, the first intermediate flow passage 52a, and the second intermediate flow passage 52b are formed at the same positions in the vertical direction Dv, and thereby communicate with one another in a straight line from the first external opening 54a to the second external opening 54b in the width direction Dw when the inside of the valve casing body 211 is viewed from the outside.

The lid part 212 is fixed to the valve casing body 211 to block the external opening 54. The lid part 212 is fixed to the valve casing body 211 by fixtures such as bolts (not shown). The lid part 212 of the present embodiment is a discoid member, in the center of which a through-hole into which the intermediate rod part 29 (to be described below) can be inserted is formed. Thereby, the lid part 212 slidably supports the intermediate rod part 29. In the present embodiment, the lid part 212 has a first lid part 212a that blocks the first external opening 54a, a second lid part 212b that blocks the second external opening 54b, and a third lid part 212c.

The outlet valve seat part 22 is provided on the outlet flow passage 53. A plurality of outlet valve seat parts 22 are provided to correspond to a plurality of outlet flow passages 53. In the present embodiment, the outlet valve seat part 22 has first outlet valve seat parts 22a provided on the first outlet flow passages 53a, and a second outlet valve seat part 22b provided on the second outlet flow passage 53b.

The outlet valve body 23 comes into contact with the outlet valve seat part 22, and closes the outlet flow passage 53. A plurality of outlet valve bodies 23 are provided to correspond to the outlet valve seat parts 22 provided on the plurality of outlet flow passage 53. In the present embodiment, the outlet valve body 23 has first outlet valve bodies 23a that come into contact with the first outlet valve seat parts 22a, and a second outlet valve body 23b that comes into contact with the second outlet valve seat part 22b. The first outlet valve bodies 23a are made movable upward in the vertical direction Dv in contact with the first outlet valve seat parts 22a. The second outlet valve body 23b is made movable upward in the vertical direction Dv in contact with the second outlet valve seat part 22b.

The inner bar 24 is connected to the outlet valve body 23 and the outlet rod part 25. The inner bar 24 moves the plurality of outlet valve bodies 23 all at once. The inner bar 24 of the present embodiment holds the plurality of first outlet valve bodies 23a and the second outlet valve body 23b. The inner bar 24 is formed in a size in which it can be inserted through the intermediate flow passage 52 and the external opening 54. To be specific, the inner bar 24 has a thick plate shape that is thick in the vertical direction Dv and extends in the width direction Dw. A cross-sectional area of the inner bar 24 in the vertical direction Dv is smaller than opening areas of the external opening 54 and the intermediate flow passage 52.

The outlet rod part 25 extends along a first central axis O1. An end of a first side of the outlet rod part 25 in a direction D1 of the first central axis is coupled to the outlet valve body 23. Here, the direction D1 of the first central axis in the present embodiment is the vertical direction Dv. The first side in the direction D1 of the first central axis is a lower side in the vertical direction Dv, and a second side in the direction D1 of the first central axis is an upper side in the vertical direction Dv. A plurality of outlet rod parts 25 of the present embodiment (two outlet rod parts in the present embodiment) are provided apart from each other in the width direction Dw. The end of the first side of the outlet rod part 25 in the vertical direction Dv is indirectly coupled to the outlet valve body 23 via the inner bar 24.

The interlocking shaft part 26 linearly moves the outlet rod part 25 in the direction D1 of the first central axis. The interlocking shaft part 26 of the present embodiment moves the outlet rod part 25 by means of a hydraulic cylinder or an E/H actuator using control oil, or an air cylinder using steam, thereby moving the inner bar 24 in the vertical direction Dv. Thereby, the plurality of first outlet valve bodies 23a and the second outlet valve body 23b are moved in the vertical direction Dv.

The intermediate valve seat part 27 is provided on the intermediate flow passage 52. In the present embodiment, the intermediate valve seat part 27 has a first intermediate valve seat part 27a provided on the first intermediate flow passage 52a, and a second intermediate valve seat part 27b provided on the second intermediate flow passage 52b.

The intermediate valve body 28 comes into contact with the intermediate valve seat part 27, and closes the intermediate flow passage 52. In the present embodiment, the intermediate valve body 28 has a first intermediate valve body 28a that comes into contact with the first intermediate valve seat part 27a, and a second intermediate valve body 28b that comes into contact with the second intermediate valve seat part 27b. The first intermediate valve body 28a is made movable outward in the width direction Dw in contact with the first intermediate valve seat part 27a. The second intermediate valve body 28b is made movable outward in the width direction Dw in contact with the second intermediate valve seat part 27b.

The intermediate rod part 29 extends along a second central axis O2 that intersects the first central axis O1. An end of a first side of the intermediate rod part 29 in a direction D2 of the second central axis is coupled to the intermediate valve body 28. Here, the direction D2 of the second central axis in the present embodiment is the width direction Dw that is a direction perpendicular to the direction D1 of the first central axis. The first side in the direction D2 of the second central axis is an inner side in the width direction Dw, and is a side at which the outlet flow passage 53 is formed with respect to the intermediate flow passage 52. A second side in the direction D2 of the second central axis is an outer side in the width direction Dw, and is a side at which the external opening 54 is formed with respect to the intermediate flow passage 52. An end of the outer side of the intermediate rod part 29 in the width direction Dw protrudes to the outside of the valve casing 21. The intermediate rod part 29 is supported to be slidable in the width direction Dw by the lid part 212 and an intermediate rod support 421 (to be described below). The intermediate rod part 29 of the present embodiment has a first intermediate rod part 29a connected to the first intermediate valve body 28a, and a second intermediate rod part 29b connected to the second intermediate valve body 28b.

The intermediate actuator part 30 linearly moves the intermediate rod part 29 in the direction D2 of the second central axis. The intermediate actuator part 30 converts a linear motion in the direction D1 of the first central axis into a linear motion in the direction D2 of the second central axis, thereby linearly moving the intermediate rod part 29 in the direction D2 of the second central axis. The intermediate actuator part 30 of the present embodiment has a first intermediate actuator part 30a that moves the first intermediate rod part 29a, and a second intermediate actuator part 30b that moves the second intermediate rod part 29b. Each of the first intermediate actuator part 30a and the second intermediate actuator part 30b has a driving part 41 and a link part 42.

The first intermediate actuator part 30a and the second intermediate actuator part 30b have the same constitution except that directions in which the intermediate rod part 29 is moved are opposite to each other in the direction D2 of the second central axis. Thus, in the present embodiment, the driving part 41 and the link part 42 of the first intermediate actuator part 30a will be described as an example.

Figure 3:
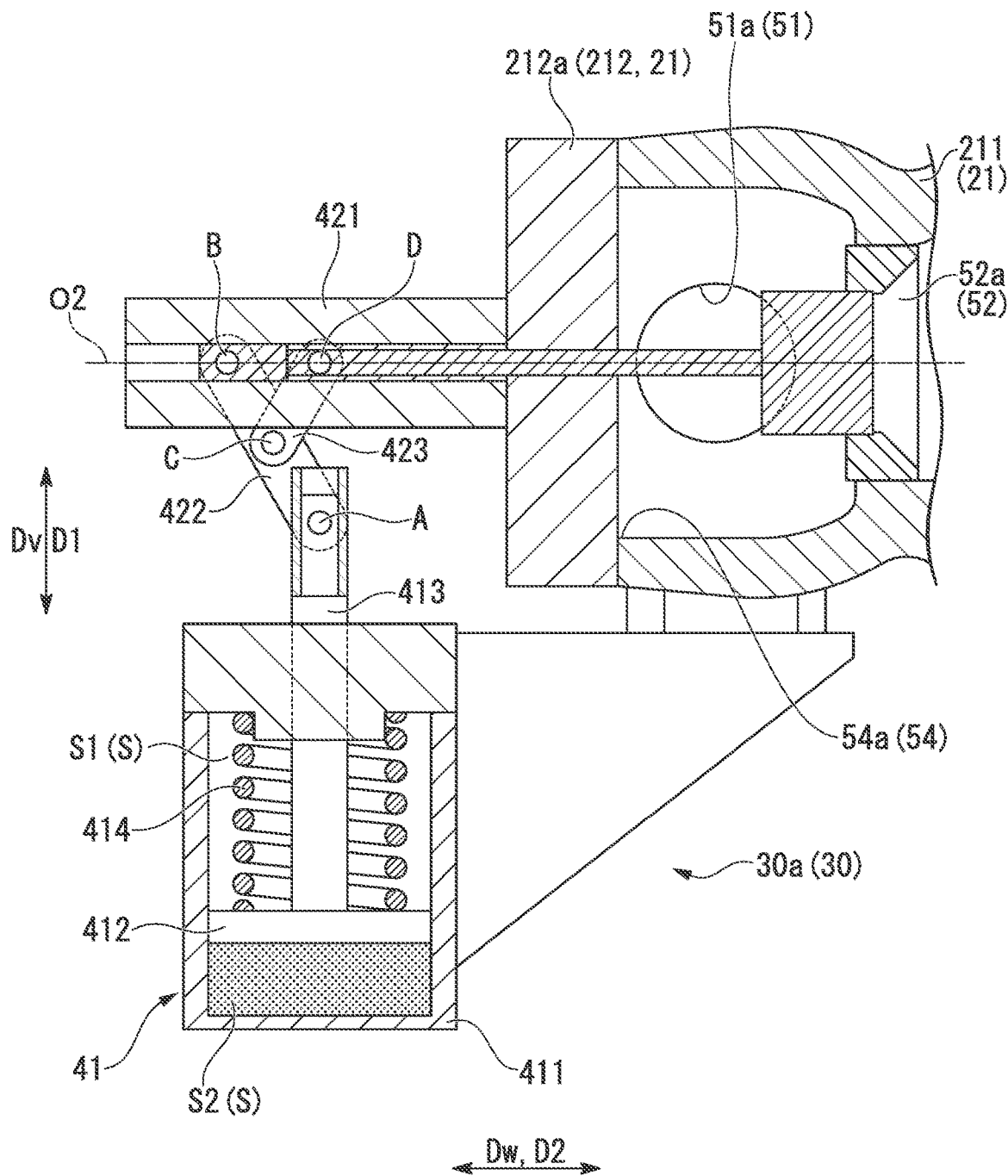
FIG. 3 is an enlarged sectional view of key parts showing the valve device of the present embodiment.

As shown in FIG. 3, the driving part 41 advances and retracts a linear motion member in the vertical direction Dv that is a direction perpendicular to the direction D2 of the second central axis. A driving source of the present embodiment is a hydraulic cylinder. The driving source of the embodiment has a cylinder part 411, a piston part 412, a piston rod part (a linear motion member) 413, and an elastic member 414.

The cylinder part 411 has a hollow cylindrical shape, and extends in the vertical direction Dv. A cylinder chamber S extending in the vertical direction Dv is formed in the cylinder part 411. Control oil is stored in the cylinder part 411. The cylinder part 411 of the present embodiment has a bottom located at a lower side in the vertical direction Dv such that the piston rod part 413 protrudes upward in the vertical direction Dv. The cylinder part 411 is fixed to the valve casing body 211.

The piston part 412 partitions the cylinder chamber S into a first chamber S1 at an upper side in the vertical direction Dv, and a second chamber S2 at a lower side in the vertical direction Dv. The piston part 412 is disposed in the cylinder chamber S. The piston part 412 moves in the vertical direction Dv. The piston part 412 is made slidable on an inner circumferential surface of the cylinder part 411 throughout the circumference, and is subjected to a change in position relative to the cylinder part 411. The piston part 412 changes the size of the first chamber S1 and the size of the second chamber S2 in connection with the movement. The piston part 412 is connected to the piston rod part 413. The piston part 412 is moved to the first side in the cylinder chamber S, thereby moving the intermediate valve body 28 to be apart from the intermediate valve seat part 27. The piston part 412 is moved to the second side in the cylinder chamber S, thereby moving the intermediate valve body 28 to be close to the intermediate valve seat part 27.

The piston rod part 413 is connected to the piston part 412. The piston rod part 413 moves along with the piston part 412. The piston rod part 413 has a columnar shape and extends in the vertical direction Dv. An end of the piston rod part 413 which is located at the upper side in the vertical direction Dv and is an end of the side at which it is connected to the piston part 412 is projected from the cylinder part 411. The piston rod part 413 is formed at a length at which the end of the piston rod part 413 which is located at the upper side in the vertical direction Dv is kept protruding from the cylinder part 411 in spite of moving downward in the vertical direction Dv.

The elastic member 414 is disposed in the first chamber S1. The elastic member 414 is biased to press the piston part 412 downward in the vertical direction Dv. The elastic member 414 is fixed to an end face located at the upper side in the vertical direction Dv on the inner circumferential surface of the cylinder part 411 in which the cylinder chamber S is formed and to an end face of the piston part 412 which is directed upward in the vertical direction Dv. For example, a coil spring is used as the elastic member 414 of the present embodiment.

The link part 42 connects the intermediate rod part 29 and the piston rod part 413. The link part 42 converts displacement of the piston rod part 413 in the direction D1 of the first central axis into displacement of the piston rod part 413 in the direction D2 of the second central axis, transmits the result to the intermediate rod part 29, and moves the intermediate rod part 29 in the direction D2 of the second central axis. That is, the link part 42 converts displacement of the piston rod part 413, which moves up and down in the vertical direction Dv, into displacement of the piston rod part 413 in the width direction Dw, and moves the intermediate rod part 29. The link part 42 of the present embodiment has an intermediate rod support 421, a first connecting member 422, and a second connecting member 423.

The intermediate rod support 421 is brought into slidable contact with an inner circumferential surface of the intermediate rod part 29. The intermediate rod support 421 has a cylindrical shape centered on the second central axis. The intermediate rod support 421 is fixed to an outer side of the lid part 212 in the width direction Dw. The intermediate rod support 421 covers a portion that is projected from the lid part 212 of the intermediate rod part 29 to the outside in the width direction Dw. The intermediate rod support 421 supports the intermediate rod part 29 via a guide bush to be slidable in the width direction Dw.

The first connecting member 422 couples the piston rod part 413 and the intermediate rod part 29. The first connecting member 422 is a flat plate member. The first connecting member 422 is connected to an upper end of the piston rod part 413 in the vertical direction Dv in a rotatable state. The first connecting member 422 is connected to an outer end of the intermediate rod part 29 in the width direction Dw in a rotatable state. Here, a connection portion between the first connecting member 422 and the piston rod part 413 is referred to as a first rotary joint A. A connection portion between the first connecting member 422 and the intermediate rod part 29 is referred to as a second rotary joint B.

The second connecting member 423 couples the first connecting member 422 and the intermediate rod part 29. The second connecting member 423 is a flat plate member that is shorter than the first connecting member 422. The second connecting member 423 is connected close to the middle of the first connecting member 422 in a rotatable state. The second connecting member 423 is fixed inwards from a position at which the first connecting member 422 of the intermediate rod part 29 is connected in the width direction Dw. Here, a connection portion between the second connecting member 423 and the first connecting member 422 is referred to as a third rotary joint C. A connection portion between the second connecting member 423 and the intermediate rod part 29 is referred to as a stationary joint D.

Figure 2:
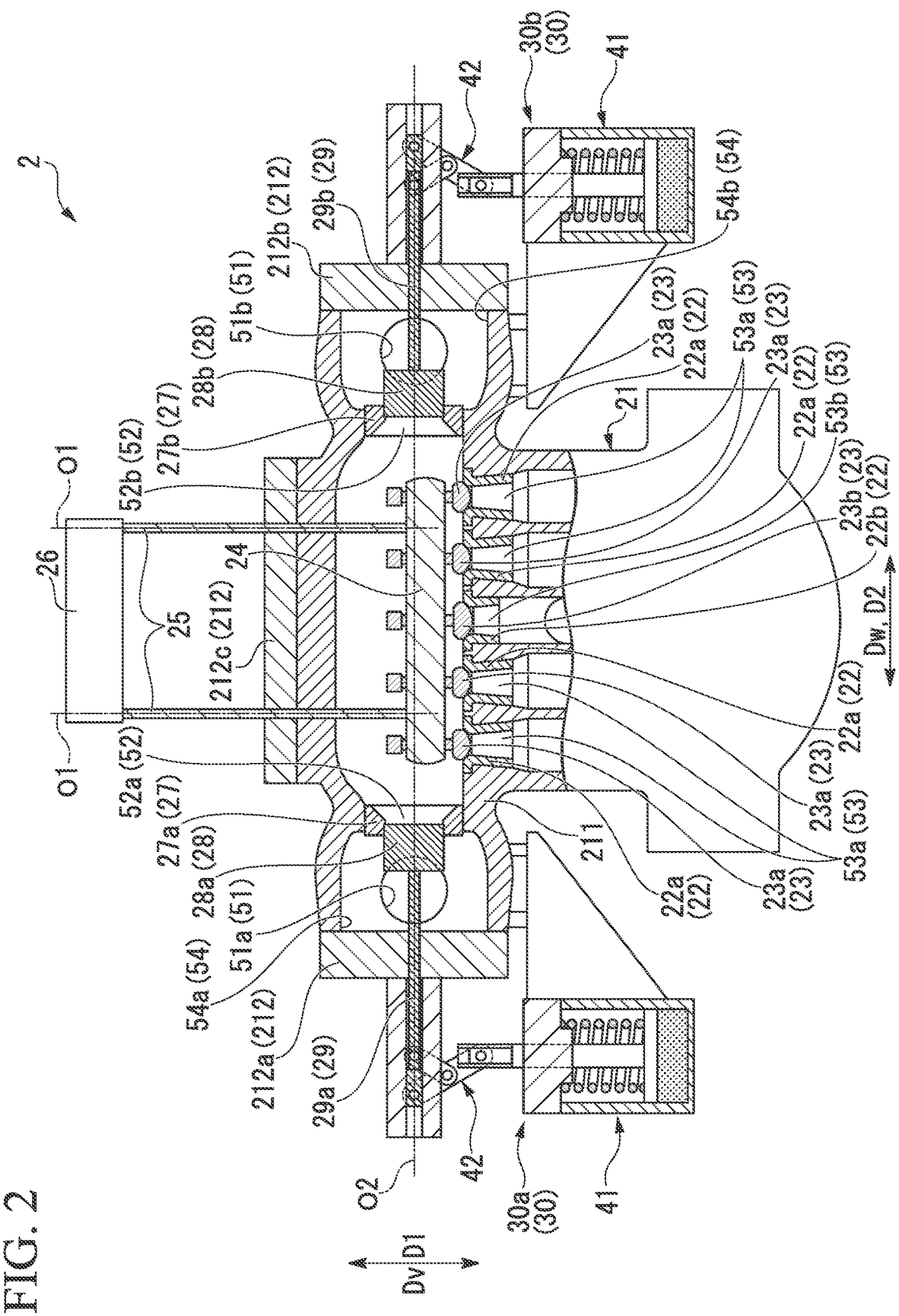
FIG. 2 is a schematic sectional view showing a valve device of an embodiment of the present disclosure.

As shown in FIG. 2, in the valve device 2 of the present embodiment, the first outlet flow passages 53a are opened and closed by the first outlet valve bodies 23a, thereby functioning as governing valves so that an amount of supply of the steam to the turbine body 100 is governed. In the valve device 2, the second outlet flow passage 53b is opened and closed by the second outlet valve body 23b, thereby functioning as an overload valve so that the amount of supply of the steam to the turbine body 100 is governed. In the valve device 2, the intermediate flow passage 52 is opened and closed by the intermediate valve body 28, thereby functioning as a stop valve so that the amount of supply of the steam to the turbine body 100 can be interrupted.

Next, an operation of the valve device 2 having the above constitution will be described.

In the steam turbine 1 as described above, the valve device 2 is put in an open state in order to force the steam from the steam supply source 200 shown in FIG. 1 to flow into the turbine body 100 during normal operation.

When the valve device 2 is put in an open state, the interlocking shaft part 26 shown in FIG. 2 is driven, and the outlet rod part 25 moves upward in the vertical direction Dv. Thereby, along with the inner bar 24, the first outlet valve bodies 23a and the second outlet valve body 23b moves upward in the vertical direction Dv. As a result, the first outlet valve bodies 23a move away from the first outlet valve seat parts 22a, and the first outlet flow passages 53a are opened. Simultaneously, the second outlet valve body 23b moves away from the second outlet valve seat part 22b, and the second outlet flow passage 53b is opened.

Furthermore, the interlocking shaft part 26 as well as the intermediate actuator part 30 is driven. To be specific, an amount of control oil is adjusted by the cylinder part 411 shown in FIG. 3, and the piston part 412 is pushed against the control oil, and moves upward in the vertical direction Dv. As the piston part 412 moves, the piston rod part 413 also moves upward in the vertical direction Dv. As the piston rod part 413 moves, the first rotary joint A moves upward in the vertical direction Dv, and the first connecting member 422 moves upward in the vertical direction Dv while being rotated. The first connecting member 422 moves upward in the vertical direction Dv while being rotated, and thereby the third rotary joint C moves outward in the width direction Dw. As a result, the second connecting member 423 also moves outward in the width direction Dw. Thereby, the second rotary joint B and the stationary joint D move outward in the width direction Dw along with the intermediate rod part 29. The intermediate rod part 29 moves outward in the width direction Dw, and thereby the intermediate valve body 28 moves away from the intermediate valve seat part 27. As a result, the intermediate valve body 28 moves away from the intermediate valve seat part 27, and the intermediate flow passage 52 is opened. Therefore, the first intermediate actuator part 30a is driven, so that the first intermediate valve body 28a moves away from the first intermediate valve seat part 27a, and the first intermediate flow passage 52a is opened. Similarly, the second intermediate actuator part 30b is driven, so that the second intermediate valve body 28b moves away from the second intermediate valve seat part 27b, and the second intermediate flow passage 52b is opened.

During normal operation, when the amount of supply of the steam to the turbine body 100 is reduced, only the interlocking shaft part 26 shown in FIG. 2 is driven to move the outlet rod part 25 downward in the vertical direction Dv. Thereby, the first outlet valve bodies 23a approach the first outlet valve seat parts 22a, and opening amounts of the first outlet flow passages 53a are reduced. Simultaneously, the second outlet valve body 23b approaches the second outlet valve seat part 22b, and the opening amount of the second outlet flow passage 53b is reduced.

In the event of an emergency stop for urgently stopping the turbine body 100 when abnormality occurs in the turbine body 100, only the intermediate actuator part 30 is driven. To be specific, contrary to when the intermediate flow passage 52 is opened, the piston part 412 shown in FIG. 3 moves downward in the vertical direction Dv. As a result, the intermediate rod part 29 moves inward in the width direction Dw due to the link part 42. The intermediate rod part 29 moves inward in the width direction Dw, and thereby the intermediate valve body 28 moves to approach the intermediate valve seat part 27. As a result, the intermediate valve body 28 comes into contact with the intermediate valve seat part 27, and the intermediate flow passage 52 is closed. Therefore, the first intermediate actuator part 30a is driven, and thereby the first intermediate valve body 28a comes into contact with the first intermediate valve seat part 27a, so that the first intermediate flow passage 52a is closed. Similarly, the second intermediate actuator part 30b is driven, and thereby the second intermediate valve body 28b comes into contact with the second intermediate valve seat part 27b, so that the second intermediate flow passage 52b is closed.

According to the valve device 2 as described above, the intermediate actuator part 30 moves the piston rod part 413 in the vertical direction Dv that is the direction perpendicular to the moving direction of the intermediate rod part 29. For this reason, in comparison with a case in which the piston rod part 413 moving in the width direction Dw is connected to the outer end of the intermediate rod part 29 in the width direction Dw, the size of the valve device 2 in the width direction Dw can be reduced. The intermediate flow passage 52 is formed at a position perpendicular to the outlet flow passage 53, and thereby the shape of the internal space of the valve casing 21 can be simplified compared to a case in which the intermediate flow passage 52 and the outlet flow passage 53 are provided in parallel. For this reason, assemblability when the outlet valve seat part 22 or the outlet valve body 23 is incorporated into the valve casing 21 can be improved. As a result, the valve device 2 can be downsized while securing the assemblability. Thereby, the entire steam turbine 1 can also be downsized.

In comparison with the case in which the intermediate rod part 29 and the piston rod part 413 extend in the width direction Dw in a connected state, the member extending in the width direction Dw can be used as the intermediate rod part 29 alone. As a result, the length of the member extending in the width direction Dw can be suppressed, and an amount of flexure caused by gravitational force can be limited. Thereby, alignment of contact between the intermediate valve body 28 and the intermediate valve seat part 27 is easily adjusted, and the main steam can be interrupted with high accuracy.

In the valve casing body 211, the external opening 54 is formed outwards from the intermediate flow passage 52 in the width direction Dw. The external opening 54 faces the intermediate flow passage 52. Thereby, when the inside of the valve casing body 211 is viewed from outside in the width direction Dw, a region in which the first outlet flow passages 53a or the second outlet flow passage 53b is formed is visible. That is, the component such as the outlet valve seat part 22 or the outlet valve body 23 can be easily inserted from outside into the region in which the first outlet flow passages 53a or the second outlet flow passage 53b is formed via the external opening 54. As a result, workability around the outlet flow passage 53 can be improved. Since the external opening 54 is also close to the inlet flow passage 51 and the intermediate flow passage 52, components can also be easily inserted into a region in which the inlet flow passage 51 or the intermediate flow passage 52 is formed. As a result, the assemblability of the components around the inlet flow passage 51 and the intermediate flow passage 52 can be improved. For this reason, there is no need to form the inlet flow passage 51, the intermediate flow passage 52, and the outlet flow passage 53 in separate casings and then integrally fix them by, for instance, welding. Therefore, there is no need to secure a region for welding, and the valve casing 21 can be reduced in size. As a result, the valve device 2 can be made smaller.

The inner bar 24 is formed in a size in which it can be inserted through the external opening 54 and the intermediate flow passage 52, and thereby can be inserted from the external opening 54. Therefore, workability can be improved when the valve device 2 having a complicated configuration in which the plurality of outlet flow passages 53 are formed is assembled.

The hydraulic cylinder that is the driving source is disposed such that the piston rod part 413 extends upward in the vertical direction Dv. For this reason, an opening portion of the cylinder part 411 is directed upward in the vertical direction Dv, and the oil in the cylinder can be prevented from leaking out. Therefore, maintenance work such as cleaning around the driving source can be reduced.

(Other Modifications of the Embodiment)

The embodiments of the present disclosure have been described in detail with reference to the drawings, but components in each of the embodiments and combinations thereof are one example, and additions, omissions, substitutions, and other modifications of the constitution are possible without departing from the spirit of the present disclosure. The present disclosure is not limited by each of the embodiments, but is limited only by the claims.

A plurality of inlet flow passages 51, a plurality of intermediate flow passages 52, a plurality of outlet flow passages 53, and a plurality of external openings 54 are not limited to being provided in one valve casing body 211 as in the present embodiment. For example, one inlet flow passage 51, one intermediate flow passage 52, one outlet flow passage 53, and one external opening 54 may be provided in one valve casing body 211, or any of the inlet flow passage 51, the intermediate flow passage 52, the outlet flow passage 53, and the external opening 54 may be provided in numbers.

If the driving part 41 can move the linear motion member in the direction perpendicular to the direction D2 of the second central axis, the driving part 41 is not limited to the hydraulic cylinder of the present embodiment. The driving part 41 may be, for instance, an air cylinder or a ball screw mechanism that converts a rotational motion of a driven motor into a linear motion by a ball screw.

The direction D1 of the first central axis that is the moving direction of the outlet rod part 25 and the direction D2 of the second central axis that is the moving direction of the intermediate rod part 29 are not limited to the vertical direction Dv and the width direction Dw that are perpendicular to each other as in the present embodiment. The direction D1 of the first central axis and the direction D2 of the second central axis need only to be directions that intersect each other. For example, when the direction D1 of the first central axis is the vertical direction Dv, the direction D2 of the second central axis may be a direction inclined with respect to the width direction Dw. In addition, when the direction D2 of the second central axis is the width direction Dw, the direction D1 of the first central axis may be a direction inclined with respect to the vertical direction Dv. Therefore, the driving part 41 advances and retracts the linear motion member in the direction perpendicular to the direction D2 of the second central axis, and thus a direction in which the linear motion member is advanced and retract and the direction D1 of the first central axis may not be identical to each other.

While preferred embodiments of the disclosure have been described and shown above, it should be understood that these are exemplary of the disclosure and are not to be considered as limiting. Additions, omissions, substitutions, and other modifications can be made without departing from the spirit or scope of the present disclosure. Accordingly, the disclosure is not to be considered as being limited by the foregoing description, and is only limited by the scope of the appended claims.

EXPLANATION OF REFERENCES

1 Steam turbine
100 Turbine body
2 Valve device
Dw Width direction
Dv Vertical direction
D1 Direction of first central axis
D2 Direction of second central axis
200 Steam supply source
21 Valve casing
211 Valve casing body
51 Inlet flow passage
51a First inlet flow passage
51b Second inlet flow passage
52 Intermediate flow passage
52a First intermediate flow passage
52b Second intermediate flow passage
53 Outlet flow passage
53a First outlet flow passage
53b Second outlet flow passage
54 External opening
54a First external opening
54b Second external opening
212 Lid part
212a First lid part
212b Second lid part
212c Third lid part
22 Outlet valve seat part
22a First outlet valve seat part
22b Second outlet valve seat part
23 Outlet valve body
23a First outlet valve body
23b Second outlet valve body
24 Inner bar
25 Outlet rod part
26 Interlocking shaft part
27 Intermediate valve seat part
27a First intermediate valve seat part
27b Second intermediate valve seat part
28 Intermediate valve body
28a First intermediate valve body
28b Second intermediate valve body
29 Intermediate rod part
O2 Second central axis
29a First intermediate rod part 29b Second intermediate rod part
30 Intermediate actuator part
30a First intermediate actuator part
30b Second intermediate actuator part
41 Driving part
411 Cylinder part
S Cylinder chamber
S1 First chamber
S2 Second chamber
412 Piston part
413 Piston rod part
414 Elastic member
42 Link part
421 Intermediate rod support
422 First connecting member
423 Second connecting member
A First rotary joint
B Second rotary joint
C Third rotary joint
D Stationary joint
O1 First central axis

What is claimed is:

1. A valve device comprising:
a valve casing in which an inlet flow passage into which a fluid flows, an intennediate flow passage that is configured to communicate with the inlet flow passage and cause the fluid to circulate in a direction that intersects the inlet flow passage, and an outlet flow passage that is configured to communicate with the intermediate flow passage and cause the fluid to circulate in a direction that intersects the intermediate flow passage are formed;
an outlet valve seat part provided on the outlet flow passage;
an outlet valve body configured to come into contact with the outlet valve seat part and to close the outlet flow passage;
an outlet rod part configured to extend along a first central axis and to have an end of a first side in a direction of the first central axis coupled to the outlet valve body;
an interlocking shaft part configured to linearly move the outlet rod part in the direction of the first central axis;
an intermediate valve seat part provided on the intermediate flow passage;
an intermediate valve body configured to come into contact with the intermediate valve seat part and to close the intermediate flow passage;
an intermediate rod part configured to extend along a second central axis that intersects the first central axis and to have an end of a first side in a direction of the second central axis coupled to the intermediate valve body; and
an intermediate actuator part configured to linearly move the intermediate rod part in the direction of the second central axis,
wherein the intermediate actuator part has:
a driving part that is configured to advance and retract a linear motion member in a direction perpendicular to the direction of the second central axis; and
a link part that is configured to connect the intermediate rod part and the linear motion member, convert displacement of the linear motion member from the direction perpendicular to the direction of the second central axis to the direction of the second central axis, transmit the converted displacement to the intermediate rod part, and move the intermediate rod part in the direction of the second central axis.

2. The valve device according to claim 1, wherein the valve casing has:
a valve casing body in which the inlet flow passage, the intermediate flow passage, and the outlet flow passage are formed, and which has an external opening that opens to communicate with an outside at a position that faces the intermediate valve seat part in a size in which the intermediate valve body is insertable; and
a lid part that blocks the external opening and slidably supports the intermediate rod part.

3. The valve device according to claim 2, further comprising an inner bar that is connected to the outlet rod part and is configured to move a plurality of outlet valve bodies provided to correspond to a plurality of outlet flow passages formed apart from each other in the direction of the second central axis all at once,
wherein the inner bar is formed in a size in which the inner bar is insertable through the external opening and the intermediate flow passage.

4. The valve device according to claim 1, wherein the direction of the first central axis is a vertical direction, and the direction of the second central axis is a horizontal direction.

5. The valve device according to claim 1, wherein the driving part is a hydraulic cylinder, and a piston rod part that is the linear motion member extends upward in the vertical direction relative to a cylinder part in which oil is stored.

6. A steam turbine comprising:
the valve device according to claim 1; and
a turbine body driven by steam supplied from the valve device.

7. The valve device according to claim 2, wherein the direction of the first central axis is a vertical direction, and the direction of the second central axis is a horizontal direction.

8. The valve device according to claim 3, wherein the direction of the first central axis is a vertical direction, and the direction of the second central axis is a horizontal direction.

* * * * *